3,027,802
PROGRAMMED STEREOSCOPIC VIEWER
Carl Elmer Larson, 8008 S. Western Ave., Chicago, Ill.
Filed May 12, 1960, Ser. No. 28,681
7 Claims. (Cl. 88—31)

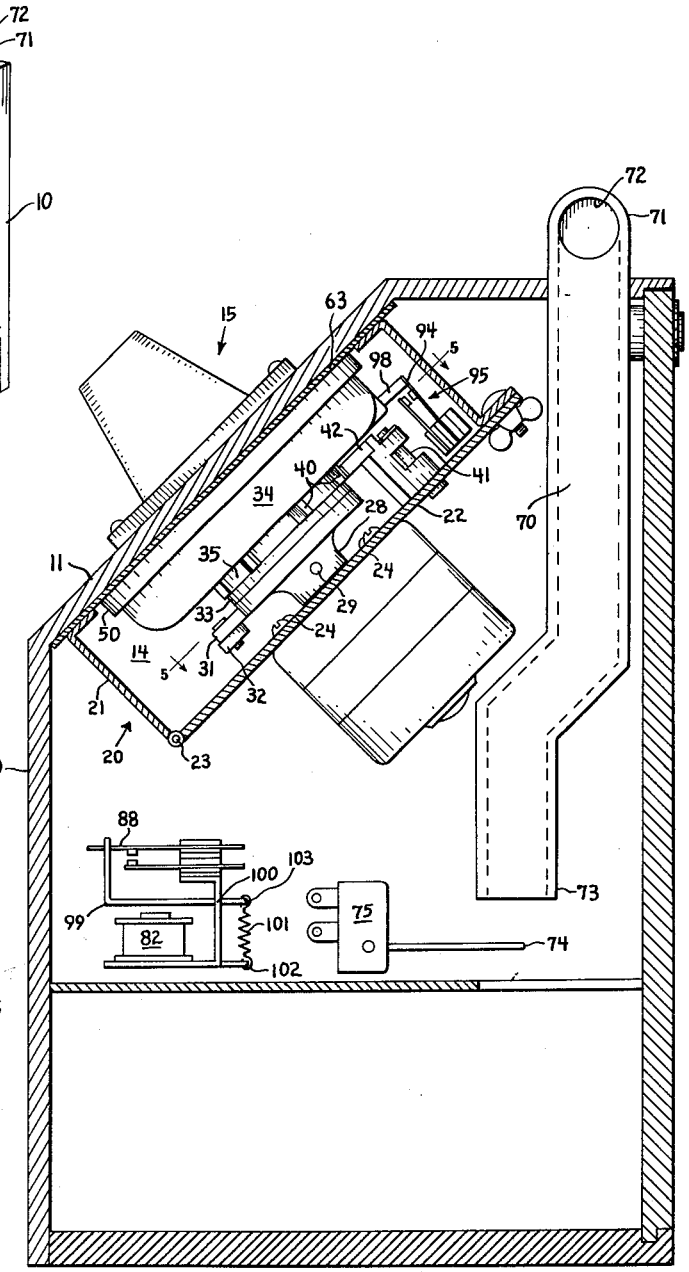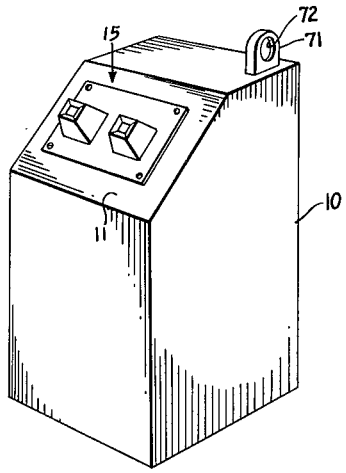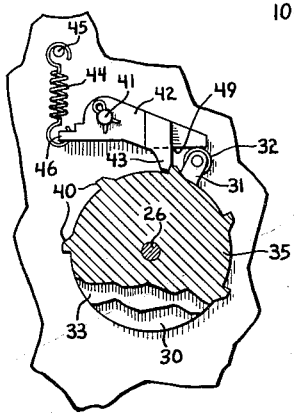

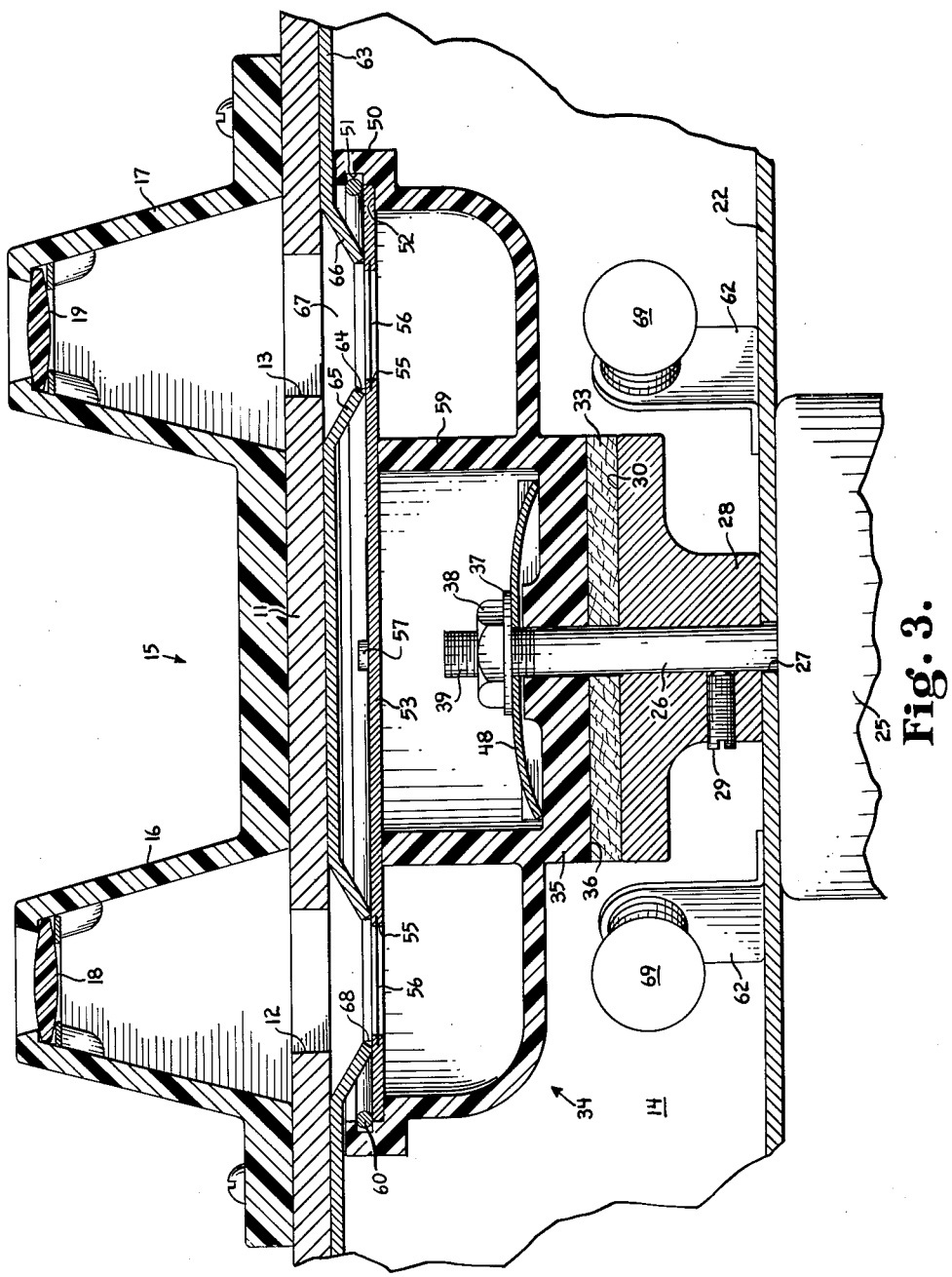

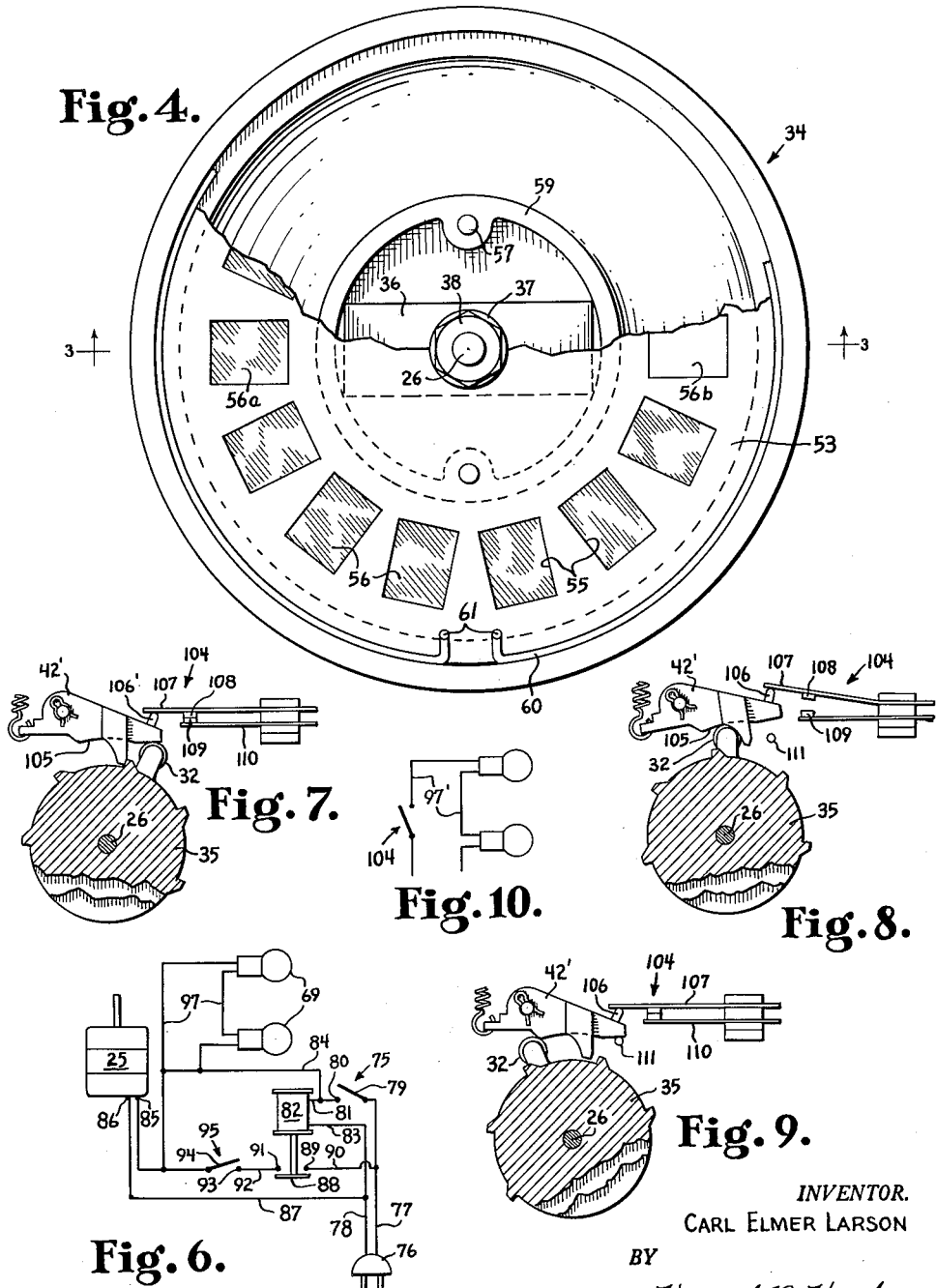

The present invention relates to a stereoscopic viewer, and is primarily concerned with the provision of simple, inexpensive mechanism, adapted for coin-controlled actuation, which will operate automatically, upon initial actuation, to carry a series of stereoscopic transparencies past a viewing station, stopping periodically with successive pairs of such transparencies in registry with a viewing head, and then proceeding until a predetermined series of such transparencies has been displayed, and then to stop and be deenergized until again reactivated.

A further object of the invention is to provide, in such an assembly, a novel mounting for the mechanism by which such transparencies are carried and moved, so arranged as to facilitate servicing and maintenance of such mechanism.

A further object of the invention is to provide novel control mechanism for apparatus of the character above described.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a perspective view of one suitable external form which may be taken by my viewer;

FIG. 2 is a vertical section through the viewer of FIG. 1, drawn to an enlarged scale;

FIG. 3 is a fragmentary section, drawn to a further enlarged scale, and illustrating the carrier for the transparencies and its driving mechanism;

FIG. 4 is an elevation of the carrier assembly, parts being broken away for clarity of illustration;

FIG. 5 is a sectional view taken substantially on the line 5—5 of FIG. 2;

FIG. 6 is a wiring diagram;

FIGS. 7, 8 and 9 are views taken substantially on the line 5—5 of FIG. 2 but showing a modified form of pawl arranged for coaction with additional switching mechanism; and FIG. 10 is a fragmentary wiring diagram illustrating the environment of the switching mechanism of FIGS. 7, 8 and 9.

Referring more particularly to the drawings, it will be seen that I have illustrated a case 10 formed to provide a sloping front wall section 11 which is formed with a pair of ports or openings 12 and 13 masked by a conventional stereoscopic viewing head indicated generally by the reference numeral 15. As shown, the head 15 comprises spaced tubes 16 and 17 carrying suitable lenses 18 and 19 arranged in registry with the ports 12 and 13, respectively.

The wall section 11 constitutes the front wall of a housing indicated generally by the reference numeral 20 and defining a chamber 14 into which the ports 12 and 13 open. The housing 20 comprises perimetral wall means 21 supported from, and projecting substantially perpendicularly from, the wall 11, and a floor or closure 22 suitably hinged, as at 23, for movement between its illustrated position, in which it closes the chamber 14, and an open position in which equipment carried on the closure 22 is readily accessible. Any suitable means may be provided for releasably holding the closure 22 in its illustrated position.

A plurality of screws 24 penetrate the closure 22 to mount on the external surface thereof a motor-reducer assembly 25. The assembly 25 may be of conventional construction and comprises a fractional-horse-power electric motor and a reduction gear driven by the motor and terminating in a shaft or spindle 26 which extends, through an opening 27 in the closure 22, into the chamber 14.

A wheel 28 is sleeved on the shaft 26 directly adjacent the internal surface of the closure 22 and is fixed to said shaft by a set screw 29 or other equivalent fastening means. The wheel 28 is formed to provide a transaxial, discoid face 30 which is presented toward the front wall 11. An actuator arm 31 projects radially from the periphery of said wheel and carries a roller 32 for a purpose which will appear. If desired, the periphery of the wheel 28 may be provided with more than one such actuator arm and roller.

A slip-friction clutch disc 33 is loosely sleeved on the shaft 26 to bear against the face 30 of the wheel 28. Any suitable material may be used for such disc, but I prefer a relatively soft felt.

A bowl 34 having a hub 35 is loosely sleeved on the shaft 26, said hub being formed to provide a transaxial, discoid face 36 presented toward the face 30 of the wheel 28 and bearing upon the clutch disc 33. A bowed leaf spring 48 is likewise arranged upon the shaft 26 with its opposite extremities resiliently bearing upon a surface of the bowl 34, and said spring is held in place by a washer 37 and a nut 38 threadedly mounted on the threaded distal end 39 of the shaft 26. It will be obvious that the spring 48 yieldably urges the surface 36 of the bowl hub 35 toward the face 30 of the wheel 28, thereby squeezing the disc 33 between said faces 30 and 36. It will also be clear that, by adjustment of the position of the nut 38, the degree of force exerted by the spring 48 may be adjusted. That force will be so adjusted that the wheel 28 and shaft 26 may turn freely while the bowl 34 is restrained against rotation but that, when such restraint is removed, the bowl 34 will turn with the wheel.

The periphery of the hub 35 is formed with a uniformly spaced series of radially-projecting teeth or abutment elements 40. Upon a stud 41 suitably supported from the closure 22 is pivotally mounted a pawl 42 having a finger 43 which, in one position of the pawl, is disposed in the path of movement of the teeth 40. The pawl 42 is biased to said position either by gravity or, as illustrated, by yielding means such as the coiled spring 44 one end of which is anchored on a post 45 carried by the closure 22 and the other end of which is operatively engaged with an ear 46 on the pawl 42. The parts are so proportioned and arranged that, when the toe 43 of the pawl 42 is in engagement with a tooth 40 on the hub 35, the bowl 34 will be restrained against rotation with the wheel 28. A surface 49 of said pawl, however, is positioned in the path of the roller 32 so that, upon each revolution of the wheel 28, the roller 32 will engage said pawl surface 49 to lift the pawl, against its bias, and withdraw the toe 43 from the path of the teeth 40. When said toe is so withdrawn, the bowl 34 will immediately be entrained with the wheel 28 to move the previously-engaged tooth 40 past the position of the toe 43. As the roller 32 moves beyond engagement with the pawl surface 49, the pawl will be returned by the spring 44 to a position in which the toe 43 rides the perimetral surface of the bowl hub 35 during the continuing rotation of the bowl, until the next succeeding tooth 40 meets the pawl toe 43, whereupon movement of the bowl will be arrested.

The bowl 34 is formed to provide an upstanding rim 50 which, when the closure 22 is in chamber-closing position, will lie closely adjacent the front wall 11. Said rim is interiorly formed with a continuous, lateral groove 51; and to the rear of the location of said groove, said bowl is formed to provide a forwardly facing, annular shoulder 52 upon which is receivable a card 53 formed with an annular series of perforations 55 in which are received transparencies 56, said transparencies being arranged in diametrically-opposite pairs. The parts are so proportioned and designed that, when the pawl toe 43 is engaged by one of the teeth 40, one such pair of transparencies, such as 56a and 56b will be positioned in registry with the lenses 18 and 19, respectively, of the viewing head 15; and when said toe is in engagement with the next succeeding tooth 40, the next succeeding pair of transparencies will be similarly in registry with said lenses. The card 53 is generally similar in construction and arrangement to the disc 17 disclosed in detail in the patent to Gruber, No. 2,511,334.

The card 53 is removably retained in position on the shoulder 52 by means of a snap ring 60 which, when expanded into the groove 51, bears against the forward surface of said card. As shown in FIG. 4, the adjacent ends of the ring 60 may be provided with upturned fingers 61 which may be grasped and pressed together to contract the ring for ready removal from the groove 51 in order to facilitate removal and replacement of the card 53.

In order to insure proper correlation of the card 53 with the ports 12 and 13, upstanding bosses 57 may be formed on the upstanding annular wall 59 of the bowl 34 to mate with suitably located perforations in the card.

At least that portion of the bowl 34 between the rim 50 and the hub 35 and wall 59 will be formed of tralucent material such as frosted glass or a suitable, cloudy synthetic plastic; and I prefer to form the whole bowl as a single plastic molding.

Preferably, light shield means is provided to insure that light emanating from a source within the chamber 14 shall reach the lenses 18 and 19 only through the transparencies 56. As shown, a sheet of opaque material 63 is interposed between the inner surface of the front wall 11 and the bowl 34, said sheet being formed with openings 64 and 68 registering, respectively, with the openings 13 and 12 in the wall 11. Each such opening in the sheet 63 is guarded by a pair of opposite, inturned flaps 65 and 66 and another pair of similarly inturned flaps, only one of which is shown at 67. The distal ends of said flaps are positioned substantially in bearing contact with the forward face of the card 53, and the flaps are so proportioned that their inner ends substantially coincide with the boundaries of the openings 55 through the car 53. Alternatively, and particularly when the front wall 11 is made of sheet metal, plastic or the like, the light shield means may comprise elements similar to the flaps 65, 66 and 67 integral with such front wall.

A suitable light source is disposed within the chamber 14, and I prefer the illustrated arrangement in which a light bulb 69 is mounted upon a bracket 62 secured to the inner surface of the closure 22 substantially in registry with each of the lenses 18 and 19, said light bulbs being positioned between the closure 22 and the tralucent bowl 34. Obviously, when the parts are in their positions as illustrated in FIG. 3, light from the bulbs 69 will be diffused as it passes through the tralucent bowl, so that the transparencies 56 will be uniformly illuminated for viewing through the lenses 18 and 19.

In the illustrated embodiment of the invention, I have shown a coin chute 70 supported from, and penetrating, the upper wall of the case 10, the upper end 71 of said chute extending outside the case and being provided with an access opening 72 for the reception of a coin. The lower end 73 of the chute is disposed above, and in registry with, an actuating arm 74 of a switch mechanism 75.

The switch mechanism 75 is of a well known type and is so constructed and arranged that it is normally open but will be temporarily closed by depression of the distal end of the arm 74. When a coin, discharged from the chute 70, strikes the arm 74, the switch 75 will be momentarily closed and then will reopen until the arm 74 is again depressed. Numerous other means for actuating a switch generally of the character of that illustrated by means of a deposited coin are well known; and I do not consider my invention to be limited to the use of any particular means for causing a deposited coin to actuate the switch mechanism 75.

In FIG. 6, I have diagrammatically illustrated circuitry for controlling the above described mechanism. A source of electrical energy is indicated by the plug 76 which may, in conventional practice, be plugged into any suitable line. Leads 77 and 78 extend from the plug 76 in accordance with conventional practice.

The switch mechanism 75 may be construed to include a contact arm 79 which normally stands in circuit-opening position but which may be moved into contact with a terminal 80 by actuation of the arm 74. The terminal 80 is connected, by wire 81, with one side of the coil of a solenoid 82, the other side of which is connected, by wire 83, with the source wire 78. Thus, when the switch 75 is momentarily closed, the solenoid 82 will be energized.

A wire 84 connects the wire 81 with one terminal 85 of the motor 25, the other terminal 86 thereof being connected, by wire 87, with the source wire 78. Thus, when the switch arm 79 is momentarily moved into contact with the terminal 80, the motor 25 is also energized.

Energization of the solenoid 82 moves a contactor 88 into bridging engagement with a terminal 89 connected by wire 90 with source wire 77, and with a terminal 91. A wire 92 connects the terminal 91 with a terminal 93 adapted to be contacted by the arm 94 of a switch 95. Said arm 94 is connected by wire 96 with the wire 84.

A cam 98 is carried by the bowl 34 in a path which, at one point, brings said cam into engagement with the switch arm 94 to move said arm into circuit-opening position. Whenever said cam is out of contact with the arm 94, the switch 95 will be closed.

Initial operation of the motor 25, when energized by closure of the switch 75, will move the cam 98 out of engagement with the arm 94, whereby the switch 95 will be closed.

Thus, with the switch 95 closed and with the solenoid 82 holding the bridge piece 88 in engagement with the terminals 89 and 91, a holding circuit for the solenoid 82 is established from source wire 77 through wire 90, terminal 89, bridge piece 88, terminal 91, wire 92, terminal 93, switch 95, wire 96, wire 84, solenoid coil 82, and wire 83 to source wire 78. An energizing circuit for the motor 25 is likewise established from source wire 77, through wire 90, terminal 89, bridge piece 88, terminal 91, wire 92, terminal 93, switch arm 94, wire 96, wire 84, motor terminals 85 and 86 and wire 87 to source wire 78. These circuits will be maintained until, during travel of the bowl 34, the cam 98 again engages the arm 94 to open the switch 95, whereupon both the motor 25 and the solenoid 82 will be deenergized.

An energizing circuit for the light bulbs 69, parallel with the motor-energizing circuits established, respectively, through the switches 75 and 95, is indicated at 97. According to the circuitry of FIG. 6, the bulbs 69 will glow at all times during energization of the motor 25.

The mechanical structure of the switching mechanism controlled by the solenoid 82, as illustrated in FIG. 2, differs somewhat from that suggested in the diagram of FIG. 6, but is the functional equivalent thereof. Thus, in FIG. 2, a lever 99 is formed with a hook overlying the resiliently flexible switch arm 88, and is pivotally mounted as at 100 upon a suitable standard. A spring 101 has one end anchored at 102 on a bracket and has its other end connected to the arm 103 of the lever 99 to hold the lever resiliently in its illustrated, upper position.

Energization of the solenoid 82 will draw the lever 99 downwardly, against the tendency of the spring 101, to close the switch.

The cam 98 is so positioned on the bowl 34 that the switch 95 will be opened just after the roller 32 has released the pawl 42. Now, if a coin is dropped into the chute 70 it will strike the arm 74 to close the switch 75 momentarily. The motor 25 is thereby energized to drive the bowl 34 far enough to release the switch arm 94 to close the switch 95; and at the same time the solenoid 82 is energized to close the switch 88 to establish the holding circuits for the solenoid, for the motor and for the lamps 69. The actuator arm 31 travels, with the wheel 28, and the bowl is carried along with that movement until the first tooth 40 engages the pawl toe 43 to arrest bowl movement. As the actuator arm continues to travel, it will engage the pawl surface 49 as the wheel 28 completes one full revolution. The pawl will thereby be lifted to release the bowl, and the previously engaged tooth 40 passes the toe 43. As the actuator 31 moves on beyond the pawl surface 49, the toe 43 will drop into engagement with the periphery of the hub 35 to meet the next advancing tooth 40 and again arrest movement of the bowl until the actuator arm 31 completes another revolution. This operation will continue until the viewer has had an opportunity to see all of the pairs of transparencies. After the last of those transparencies has been seen, the cam 98 is closely adjacent the switch arm 94; and as the actuator 31 again lifts the pawl 42 to release the bowl 34, the first few degrees of travel of the bowl will cause the cam 98 to lift the switch arm 94 to open the switch 95. Since the switch 75 is open, opening of the switch 95 will deenergize the solenoid 82 to permit opening of the switch 88, and the entire system will be deenergized.

It may be deemed desirable to extinguish the lamps 69 during travel of the bowl 34; and in FIGS. 7 to 10 I have illustrated an arrangement whereby that may be automatically accomplished. In the energizing circuit 97' for the bulbs 69, there may be interposed a switch 104 which may be of the character illustrated in those figures. A pawl 42', which differs from the pawl 42 only in the provision of an elongation 105 of the roller-engaged surface, is provided with a finger 106 cooperatively engaging a resiliently flexible arm 107 of the switch 104. A contact point 108 is carried on the arm 107 and is normally engaged with a contact point 109 on the other arm 110 of said switch. As will be apparent from an examination of FIGS. 7, 8 and 9, as the roller 32 engages the pawl 42' to lift its toe out of the path of the teeth 40, the finger 106 lifts the switch arm 107 to move the point 108 out of engagement with the point 109, thereby extinguishing the lamp bulbs; and the elongated roller-engaged surface 105 of the pawl holds the pawl in a position to maintain the switch 104 open until just before the next succeeding tooth reaches a point to engage the pawl toe, whereupon the pawl is released to stop further travel of the bowl 34 and, at the same time, the switch 104 is reclosed to light the bulbs 69.

It may be desirable to provide a stop pin 111, supported from the closure 22, and positioned for engagement by the pawl 42 or 42', when released by the actuator 31, to support the pawl toe 43 just out of contact with the periphery of the hub 35.

I claim as my invention:

1. A stereoscopic viewer comprising a housing having a ported front wall, perimetral wall means projecting rearwardly relative to said front wall, and a rear wall mounted for hinged movement toward and away from said front wall between a position closing the space within said housing and a position providing access to said space, an electric motor supported from said rear wall, a shaft driven by said motor and projecting forwardly from said rear wall into said space, a wheel fixed to said shaft and having a forwardly-presented, discoid face, a tralucent bowl having a hub loosely mounted on said shaft, said hub having a rearwardly-presented, discoid face, a friction washer interposed between and in frictional engagement with said discoid faces, means resiliently urging said bowl axially toward said wheel, a perforated card removably carried by said bowl adjacent, and in parallelism with, said front wall when said rear wall is in space-closing position, an annular series of transparencies supported in the perforations of said card and arranged in diametrically-opposed pairs, a light source within said space between said rear wall and said bowl and supported from said rear wall, means for energizing said motor, and means supported from said rear wall within said space, engageable with said bowl to hold said bowl, against rotation with said shaft, in a position in which any pair of transparencies registers with the front wall ports, means travelling with said shaft to render said holding means periodically ineffective, and means travelling with said bowl to deenergize said motor upon completion of a predetermined arc of travel of said bowl.

2. A viewer for transparencies comprising a housing having a ported front wall, perimetral wall means projecting rearwardly relative to said front wall, and a rear wall mounted for hinged movement toward and away from said front wall between a position closing the space within said housing and a position providing access to said space, an electric motor supported from said rear wall, a shaft driven by said motor and projecting forwardly from said rear wall into said space, a wheel fixed to said shaft and having a forwardly-presented discoid face, a tralucent bowl having a hub loosely mounted on said shaft, said hub having a rearwardly-presented, discoid face, a friction washer interposed between and in frictional engagement with said discoid faces, means resiliently urging said bowl axially toward said wheel, a perforated card removably carried by said bowl adjacent, and in parallelism with, said front wall when said rear wall is in space-closing position, an annular series of transparencies supported in the perforations of said card, a light source within said space between said rear wall and said bowl and supported from said rear wall, means for energizing said motor, and means supported from said rear wall within said space, engageable with said bowl to hold said bowl, against rotation with said shaft, in a position in which any one of said transparencies registers with a front wall port, means travelling with said shaft to render said holding means periodically ineffective, and means travelling with said bowl to deenergize said motor upon completion of a predetermined arc of travel of said bowl.

3. In a device of the class described, a shaft, an electric motor operatively connected to drive said shaft, a wheel fixed to rotate with said shaft and having a transaxial, discoid face, a tralucent element loosely mounted on said shaft and having a hub provided with a transaxial, discoid face arranged in opposition to said wheel face, a slipping clutch disc interposed between said discoid faces, means yieldably squeezing said clutch disc between said discoid faces, a plurality of abutment members moving with said tralucent element and arranged in a uniformly-spaced series about the axis of said shaft, stop means disposed adjacent the path of said abutment members and yieldably biased into said path, actuator means moving with said shaft and engageable with said stop means periodically to move said stop means temporarily out of said path, a first energizing circuit for said motor including a first normally-open switch, means for momentarily closing said switch to energize said motor, another energizing circuit for said motor including a second normally-open switch and a normally closed switch in series, electric actuating means effective, when energized, to close said second normally-open switch, an energizing circuit for said actuating means dominated by said first normally-open switch, a holding circuit for said actuating means dominated by said second normally-open switch and said normally closed switch, and means moving with said element and operable to open said normally-closed switch after completion of a predetermined arc of travel of said element.

4. A viewer for transparencies comprising a housing having a ported front wall, perimetral wall means projecting rearwardly relative to said front wall, and a rear wall mounted for hinged movement toward and away from said front wall between a position closing the space within said housing and a position providing access to said space, an electric motor supported from said rear wall, a shaft driven by said motor and projecting forwardly from said rear wall into said space, a wheel fixed to said shaft and having a forwardly-presented discoid face, a tralucent bowl having a hub loosely mounted on said shaft, said hub having a rearwardly-presented, discoid face, a friction washer interposed between and in frictional engagement with said discoid faces, means resiliently urging said bowl axially toward said wheel, a perforated card removably carried by said bowl adjacent, and in parallelism with, said front wall when said rear wall is in space-closing position, an annular series of transparencies supported in the perforations of said card, a light source within said space between said rear wall and said bowl and supported from said rear wall, a plurality of abutment members moving with said bowl and arranged in a uniformly-spaced series about the axis of said shaft, stop means supported from said rear wall adjacent the path of said abutment members and yieldably biased into said path, said abutment members and said stop means being so arranged and proportioned relative to said transparencies that, when said stop means engages any one of said abutment members, said bowl will be held with a corresponding one of said transparencies in registry with a front wall port, actuator means moving with said shaft and engageable with said stop means periodically to move said stop means temporarily out of said path, an energizing circuit for said motor including a normally-closed switch and a normally-open switch in series, means for closing said normally-open switch, and means moving with said bowl and operable to open said normally-closed switch after completion of a predetermined arc of travel of said bowl.

5. A stereoscopic viewer comprising a case having a ported, sloping front wall, perimetral wall means carried by said front wall in circumscribing relation to the port means thereof and extending inwardly into said case, a closure for said perimetral wall means hingedly supported therefrom and movable about its hinged axis into and out of closing relation thereto to define with said case front wall and said perimetral wall means a substantially closed housing, a stereoscopic viewing head mounted on the external surface of said case front wall to register with the port means thereof, a shaft supported from said closure for rotation about an axis which, when said closure is in such closing relation, is substantially perpendicular to said front wall, said shaft extending into said housing, a wheel fixed to said shaft within said housing and presenting a transaxial, substantially plane face toward said front wall, a tralucent element loosely mounted on said shaft between said wheel and said front wall and having a transaxial, substantially plane face opposed to said wheel face, a slipping clutch disc coaxial with said shaft and interposed between said transaxial faces, means resiliently pressing said tralucent element toward said wheel to establish a frictional drive connection therebetween through said clutch disc, a card removably carried by said tralucent element in closely-adjacent parallelism with said front wall, an annular series of transparencies carried by said card and arranged in diametrically-opposed pairs for successive registration with said viewing head, a peripherally-arranged series of teeth moving with said tralucent element, a pawl pivotally supported from said closure and having a portion biased toward a position in the path of said teeth to restrain said tralucent element against rotation, actuator means travelling with said shaft and engageable with said pawl periodically to shift said pawl portion temporarily out of said path, an electric motor supported from said closure and operatively connected to drive said shaft, lamp means supported from said closure and disposed between said closure and said tralucent element, energizing circuits for said motor and said lamp means, means within said case for closing said circuits, and switch means, actuated by means travelling with said tralucent element upon completion of a predetermined arc of travel of said tralucent element, to open said circuits.

6. The stereoscopic viewer of claim 5 including other switch means in the energizing circuit for said lamp means, independent of said motor energizing circuit, and means actuated by said actuator means to open said other switch means during travel of said tralucent element.

7. The viewer of claim 1 including a light shield supported within said housing and comprising boundary wall means extending from said front wall substantially into contact with said card, the edges of said boundary wall means adjacent said card circumscribing an area substantially coincident with the boundaries of one transparency in registry with one of said front wall ports, and circumscribing another area substantially coincident with the boundaries of the other transparency paired with such one transparency.

References Cited in the file of this patent

UNITED STATES PATENTS

| | | |
|---|---|---|
| 445,456 | Rodgers | Jan. 27, 1891 |
| 1,493,618 | Dumont | May 13, 1924 |
| 1,880,484 | Rathbun | Oct. 4, 1932 |
| 2,296,765 | Brost | Sept. 22, 1942 |
| 2,365,547 | Hausherr | Dec. 19, 1944 |
| 2,530,531 | McClellan | Nov. 21, 1950 |
| 2,609,726 | Perillo | Sept. 9, 1952 |
| 2,679,705 | Rainous | June 1, 1954 |
| 2,897,721 | Cohn et al. | Aug. 4, 1959 |
| 2,906,168 | Schlafly | Sept. 29, 1959 |